(12) United States Patent
Nomachi et al.

(10) Patent No.: US 10,447,640 B2
(45) Date of Patent: Oct. 15, 2019

(54) COMMUNICATION DEVICE, CONTROL METHOD, AND CONTROL PROGRAM

(71) Applicant: KYOCERA Corporation, Kyoto-shi, Kyoto (JP)

(72) Inventors: Nayu Nomachi, Yokohama (JP); Hiroshi Tsuruta, Yokohama (JP); Hideko Murakami, Yokohama (JP); Daisuke Ibuki, Yokohama (JP); Yuki Yamada, Yokohama (JP)

(73) Assignee: KYOCERA CORPORATION, Kyoto-Shi, Kyoto ( * ) Notice: Subject to any disclaimer, the term of this patent is extended or adjusted under 35 U.S.C. 154(b) by 269 days.

(21) Appl. No.: 15/172,157

(22) Filed: Jun. 3, 2016

(65) Prior Publication Data

US 2016/0359788 A1 Dec. 8, 2016

(30) Foreign Application Priority Data

Jun. 5, 2015 (JP) .................................. 2015-114920

(51) Int. Cl.
*G06F 15/173* (2006.01)
*H04L 12/58* (2006.01)

(52) U.S. Cl.
CPC .............. *H04L 51/22* (2013.01); *H04L 51/14* (2013.01)

(58) Field of Classification Search
CPC ................................ H04L 51/22; H04L 51/14
USPC ........................................................ 709/206
See application file for complete search history.

(56) References Cited

U.S. PATENT DOCUMENTS

| 7,394,791 B2* | 7/2008 | Proctor, Jr. ........... H04L 5/0007 370/335 |
| 9,525,923 B2* | 12/2016 | Proctor, Jr. ........... H04W 76/27 |
| 9,756,549 B2* | 9/2017 | Perdomo ............... H04W 40/12 |
| 10,084,782 B2* | 9/2018 | Rolfe ................... H04L 63/0861 |
| 10,189,692 B2* | 1/2019 | High ......................... E01H 5/12 |
| 2011/0225539 A1* | 9/2011 | Lee ........................ G06F 3/0485 715/784 |
| 2014/0029035 A1* | 1/2014 | Maruyama ............ G06F 3/1297 358/1.13 |
| 2015/0142897 A1* | 5/2015 | Alten ..................... H04L 51/36 709/206 |

FOREIGN PATENT DOCUMENTS

| JP | 2010-108019 A | 5/2010 |
| JP | 2014-26562 A | 2/2014 |

* cited by examiner

Primary Examiner — Thanh T Nguyen
(74) Attorney, Agent, or Firm — Hauptman Ham, LLP

(57) ABSTRACT

In one aspect, a communication device that sends mail including a destination address entry field, a subject entry field, and a message body entry field includes a controller that moves a character group entered in the destination address entry field or a character group entered in the subject entry field to the message body entry field if the character group satisfies a predetermined condition. If the predetermined condition is satisfied, the communication device determines that the character group presumed to be the message body of the mail has been entered in the entry field for the destination address or the subject of the mail, and moves the entered character group to the message body entry field.

6 Claims, 5 Drawing Sheets

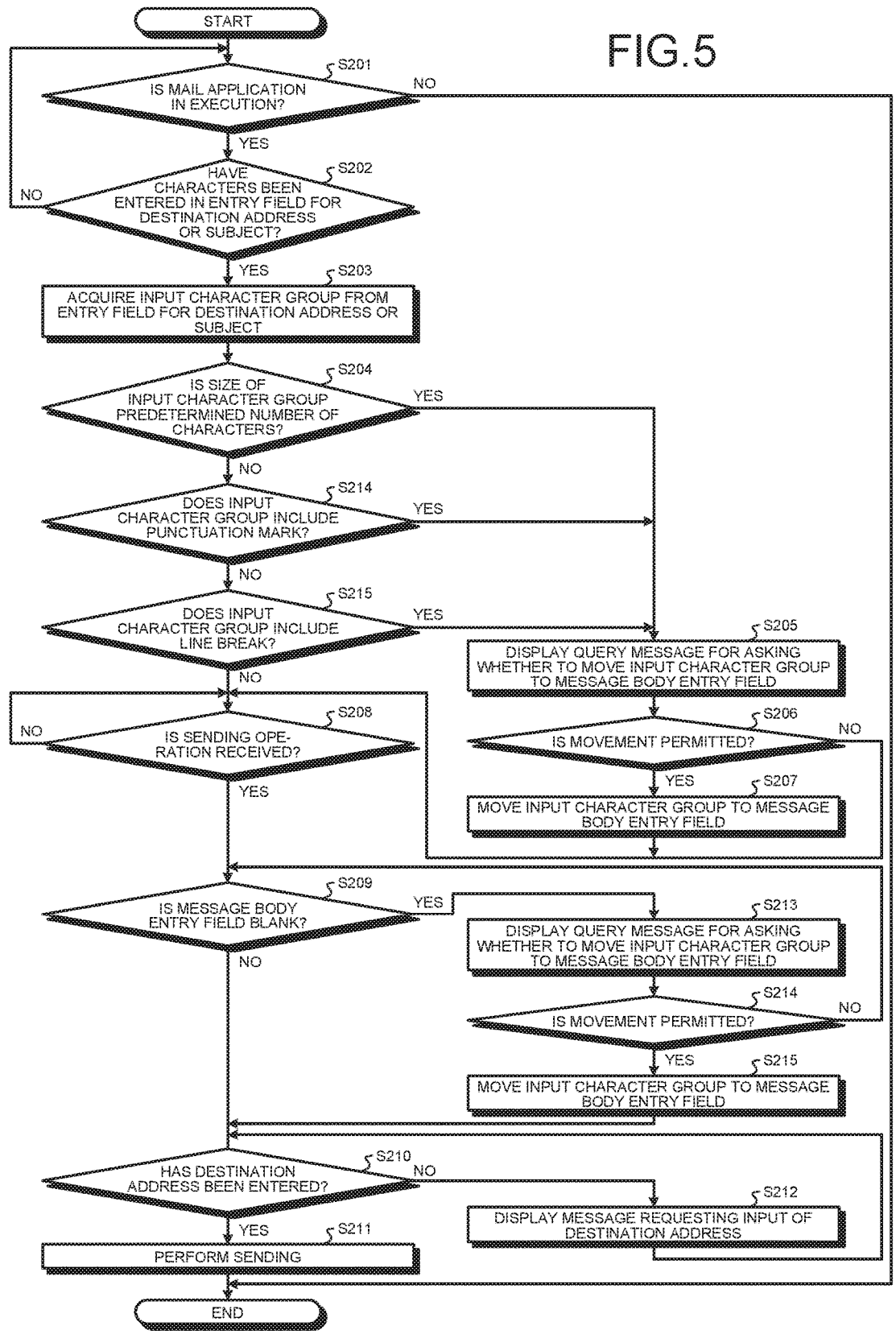

COMMUNICATION DEVICE, CONTROL METHOD, AND CONTROL PROGRAM

CROSS-REFERENCE TO RELATED APPLICATION

The present application claims priority to and incorporates by reference the entire contents of Japanese Patent Application No. 2015-114920 filed in Japan on Jun. 5, 2015.

BACKGROUND

Field

The present application relates to a communication device, a control method, and a control program.

Description of the Related Art

Conventionally, a screen for composing an electronic mail message is provided with a destination address entry field, a subject entry field, and a message body entry field in a separate manner. Maximum numbers of enterable characters are set for the respective entry fields. The maximum numbers of characters for the destination address entry field and the subject entry field are often set to small values.

SUMMARY

It is an object of embodiments to at least partially solve the problems in the conventional technology.

According to one aspect, there is provided a communication device, configured to send mail including a destination address entry field, a subject entry field, and a message body entry field. The communication device includes a controller configured to move a character group entered in the destination address entry field or a character group entered in the subject entry field to the message body entry field if the character group satisfies a predetermined condition.

According to one aspect, there is provided a control method executed by a communication device configured to send mail including a destination address entry field, a subject entry field, and a message body entry field. The control method includes determining whether a character group entered in the destination address entry field or a character group entered in the subject entry field satisfies a predetermined condition; and moving the character group to the message body entry field if the character group satisfies the predetermined condition.

According to one aspect, there is provided a non-transitory storage medium that stores a control program for causing, when executed by a communication device configured to send mail including a destination address entry field, a subject entry field, and a message body entry field, the communication device to execute determining whether a character group entered in the destination address entry field or a character group entered in the subject entry field satisfies a predetermined condition; and moving the character group to the message body entry field if the character group satisfies the predetermined condition.

The above and other objects, features, advantages and technical and industrial significance of embodiments will be better understood by reading the following detailed description of presently preferred embodiments, when considered in connection with the accompanying drawings.

BRIEF DESCRIPTION OF THE DRAWINGS

FIG. 5 is a flowchart illustrating another process flow of the communication device according to the embodiment.

DETAILED DESCRIPTION OF THE PREFERRED EMBODIMENT

A plurality of embodiments of a communication device, a control method, and a control program according to the present application are described in detail with reference to the drawings.

Figure 1:
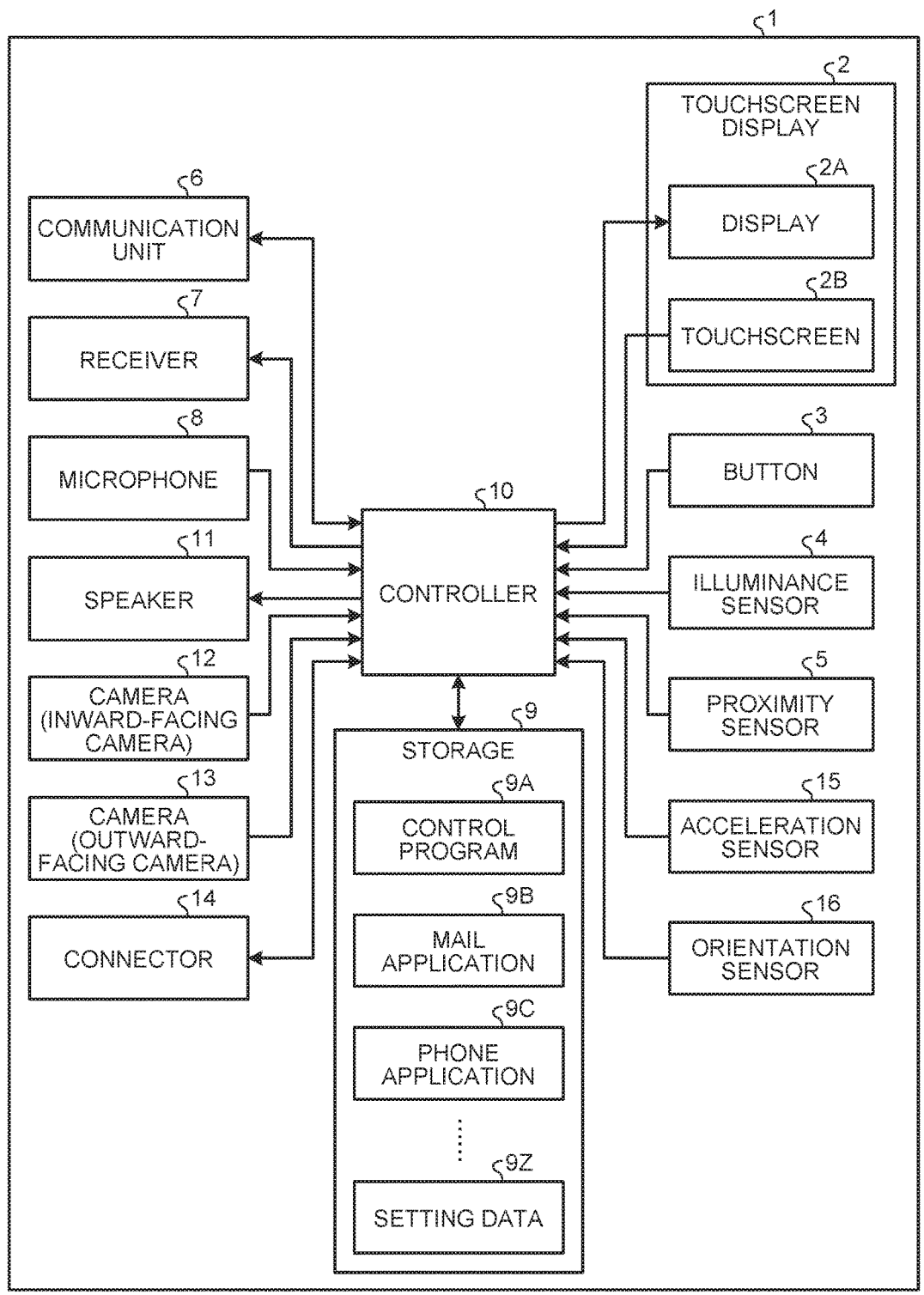
FIG. 1 is a block diagram illustrating the functional configuration of a communication device according to an embodiment.

An example of the functional configuration of a communication device according to some embodiments is described with reference to FIG. 1. FIG. 1 is a block diagram illustrating the functional configuration of a communication device according to some embodiments. In the following description, the same reference signs may be assigned to the same components. Redundant descriptions may be omitted.

As illustrated in FIG. 1, a communication device 1 includes a touchscreen display 2, a button 3, an illuminance sensor 4, a proximity sensor 5, a communication unit 6, a receiver 7, a microphone 8, a storage 9, a controller 10, a speaker 11, a camera 12, a camera 13, a connector 14, an acceleration sensor 15, and an orientation sensor 16.

The touchscreen display 2 includes a display 2A and a touchscreen 2B. The display 2A and the touchscreen 2B may be, for example, located so as to overlap each other, located side by side, or located apart from each other. If the display 2A and the touchscreen 2B are located so as to overlap each other, the display 2A may be disposed such that, for example, one or a plurality of sides thereof extends along none of the sides of the touchscreen 2B.

The display 2A is provided with a display device such as a liquid crystal display (LCD), an organic electro-luminescence (EL) display (OELD), or an inorganic electro-luminescence display (IELD). The display 2A displays characters, images, symbols, patterns, or the like. Screens containing characters, images, symbols, patterns, or the like to be displayed by the display 2A include: a screen called a lock screen; a screen called a home screen; and an application screen to be displayed when an application is running. The home screen may be also called a desktop, a standby screen, an idle screen, a default screen, an application list screen, or a launcher screen.

The touchscreen 2B detects contact or proximity of a finger, a pen, a stylus pen, or the like with or to the touchscreen 2B. When a plurality of such fingers, pens, stylus pens, or the like are in contact with or proximity to the touchscreen 2B, the touchscreen 2B can detect the positions thereof on the touchscreen 2B. The fingers, pens, stylus pens, or the like detected by the touchscreen 2B are called "fingers" in some cases. The positions of contact or proximity of the fingers detected by the touchscreen 2B are called "detected positions" in some cases. The touchscreen 2B notifies the controller 10 of the contact and the detected positions of the fingers on the touchscreen 2B. Operations that can be performed by the touchscreen 2B can be performed by the touchscreen display 2, which includes the touchscreen 2B. In other words, the touchscreen display 2 may perform the operations to be performed by the touchscreen 2B.

The touchscreen 2B can employ any detection method, such as a capacitive method, a resistive method, a surface acoustic wave method (or ultrasonic method), an infrared method, an electromagnetic induction method, or a load detection method.

The controller 10 determines a type of gesture based on at least one of a contact detected by the touchscreen 2B, a position where the contact is detected, a change in the position where the contact is detected, a interval of detection of the contact, and the number of times of that a contact has been detected. Operations that can be performed by the controller 10 can be performed by the communication device 1, which includes the controller 10. In other words, the communication device 1 may perform the operations to be performed by the controller 10. The gesture is an operation performed on the touchscreen 2B using the fingers. The operation performed on the touchscreen 2B may be performed on the touchscreen display 2, which includes the touchscreen 2B. Examples of the gesture determined by the controller 10 via the touchscreen 2B include, but are not limited to, touching, long touching, releasing, swiping, tapping, double tapping, long tapping, dragging, flicking, pinching in, and pinching out.

The button 3 receives an operational input from a user. The number of buttons 3 may be one or more than one.

The illuminance sensor 4 detects illuminance levels. An illuminance level is a value of a light flux incident to a unit area of a measurement surface of the illuminance sensor 4. The illuminance sensor 4 is used for, for example, adjustment of the luminance of the display 2A.

The proximity sensor 5 detects the presence of a nearby object without making contact therewith. The proximity sensor 5 detects the presence of an object, based on a change in magnetic field, a change in return time of reflected waves of ultrasound waves to return, or the like. The proximity sensor 5 detects, for example, approaching of a face to the display 2A. The illuminance sensor 4 and the proximity sensor 5 may be configured as a single sensor. The illuminance sensor 4 may be used as a proximity sensor.

The communication unit 6 wirelessly communicates. Examples of a wireless communication standard supported by the communication unit 6 include, for example, communication standards for cellular phones such as 2G, 3G, and 4G, and communication standards for short range communication. Examples of a communication standard for cellular phones include, for example, Long Term Evolution (LTE), Wideband Code Division Multiple Access (W-CDMA), Worldwide Interoperability for Microwave Access (WiMAX (registered trademark)), Code Division Multiple Access (CDMA) 2000, Personal Digital Cellular (PDC), Global System for Mobile Communications (GSM (registered trademark)), and Personal Handy-phone System (PHS). Examples of a communication standard for short range communication include, for example, IEEE802.11, Bluetooth (registered trademark), Infrared Data Association (IrDA), Near Field Communication (NFC), and Wireless Personal Area Network (WPAN). Examples of a WPAN communication standard include ZigBee (registered trademark). The communication unit 6 may support one or more of the communication standards listed above.

The receiver 7 is an example of a sound output unit. The receiver 7 outputs a sound signal transmitted from the controller 10 as sound. The receiver 7 can output, for example, the sound of a video, the sound of music reproduced on the communication device 1, and the voice of a communication partner during a phone call The microphone 8 is an example of a sound input unit. The microphone 8 converts, for example, voice of the user into a voice signal, and transmits it to the controller 10.

The storage 9 stores therein a computer program and data. The storage 9 is utilized also as a work area that temporarily stores results of processes executed by the controller 10. The storage 9 may include any desirable non-transitory storage medium such as a semiconductor storage medium and a magnetic storage medium. The storage 9 may include a plurality of kinds of storage medium. The storage 9 may include a combination of a storage medium (such as a memory card, an optical disc, or a magneto optical disk) and a storage medium reader. The storage 9 may include a storage device such as a random access memory (RAM) that is utilized as a temporary storage area.

Computer programs stored in the storage 9 includes applications executed on the foreground or background and a control program (not illustrated) that supports operations of the applications. Screens of the applications are displayed on the display 2A when, for example, being executed on the foreground. The control program includes, for example, an operating system (OS). The applications and a basic program may be installed in the storage 9 via wireless communication by the communication unit 6 or via a non-transitory storage medium.

The storage 9 stores, for example, a control program 9A, a mail application 9B, a phone application 9C, and setting data 9Z.

The control program 9A can provide a function in which, if a character group entered in a destination address entry field or a character group entered in a subject entry field satisfies a predetermined condition, the character group is moved to a message body entry field in cooperation with a function provided by the mail application 9B. For example, the control program 9A can provide a function in which, when a character group including a predetermined number or more of characters has been entered in the destination address entry field or the subject entry field, the character group is moved to the message body entry field. For example, the control program 9A can provide a function in which, when a punctuation mark is entered in the destination address entry field or the subject entry field, the character group is moved to the message body entry field. For example, the control program 9A can provide a function in which, when a line break is entered in the destination address entry field or the subject entry field, the character group is moved to the message body entry field. For example, the control program 9A can provide a function in which, when a send operation is performed while the message body entry field is blank, the character group is moved to the message body entry field. For example, the control program 9A can provide a function to give the user a notification to ask whether the character group may be moved, before moving the character group to the message body entry field.

The mail application 9B provides an electronic mail (e-mail) function for composing, sending, receiving, and displaying an e-mail message. In the present embodiment, the mail application 9B performs processing in cooperation with the control program 9A. The phone application 9C provides a phone-call function for a phone call via the wireless communication.

The setting data 9Z includes various types of data used in processing executed based on functions provided by, for example, the control program 9A, and in processing executed based on functions provided by, for example, the mail application 9B. The setting data 9Z includes data about change in atmospheric pressure for inferring whether the communication device is immersed in water. The setting data 9Z includes the condition for moving the character group entered in the destination address entry field or the subject entry field to the message body entry field.

The controller 10 includes an arithmetic processor. Examples of the arithmetic processor include but are not limited to a central processing unit (CPU), a system-on-a-chip (SoC), a micro control unit (MCU), a field-programmable gate array (FPGA), and a coprocessor. The controller 10 integrally controls operation of the communication device 1, thereby implementing various functions.

Specifically, the controller 10 executes instructions contained in a computer program stored in the storage 9 while referring, as needed, to data stored in the storage 9. The controller 10 then controls functional modules in accordance with the data and the instructions, thereby implementing the various functions. The examples of the functional module include but are not limited to the display 2A, the communication unit 6, the microphone 8, and the speaker 11. The controller 10 may change the control in accordance with a detection result from a detection module. The examples of the detection module include but are not limited to the touch screen 2B, the button 3, the illuminance sensor 4, the proximity sensor 5, the microphone 8, the camera 12, the camera 13, the acceleration sensor 15, and the orientation sensor 16.

Figure 2:
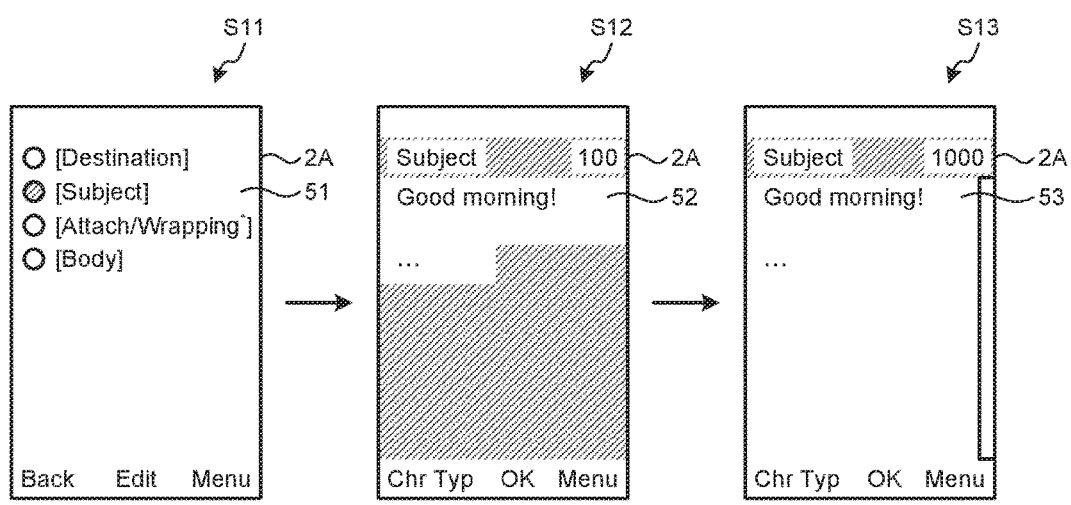
FIG. 2 is a diagram illustrating an example of control of the communication device according to the embodiment.
Figure 3:
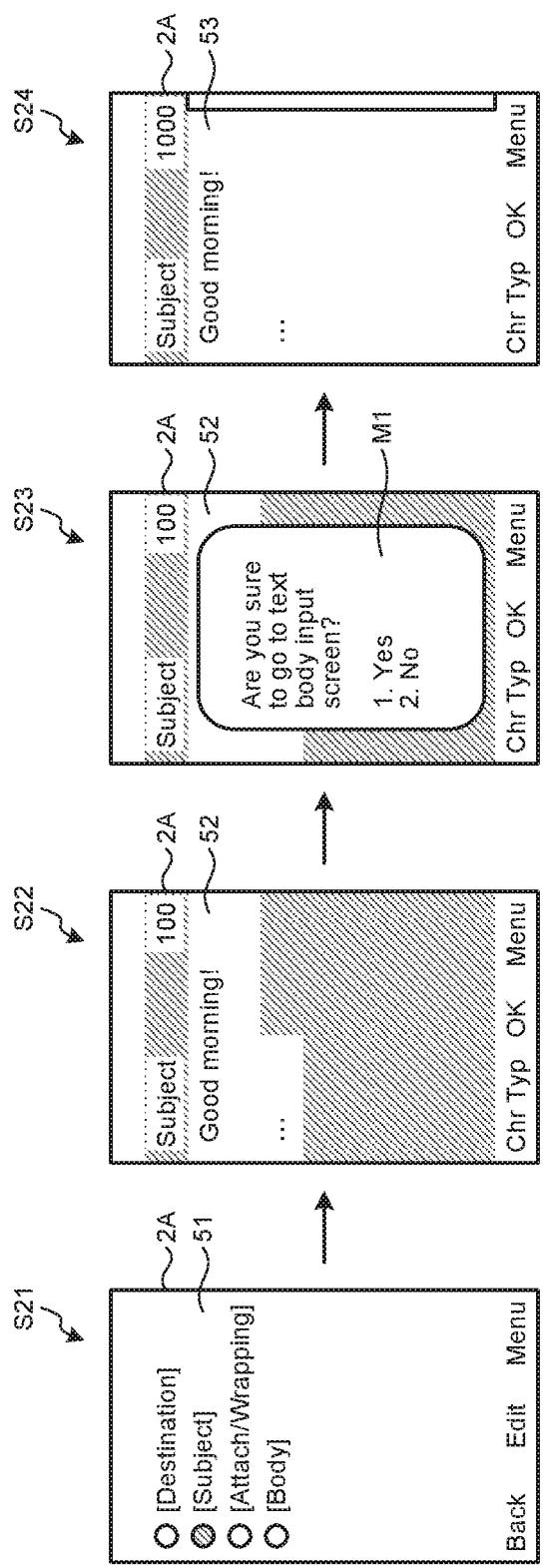
FIG. 3 is a diagram illustrating another example of the control of the communication device according to the embodiment.

In cooperation with the function provided by the mail application 9B, the controller 10 executes the control program 9A to perform the processing to move the character group entered in the destination address entry field or the character group entered in the subject entry field to the message body entry field if the character group satisfies the predetermined condition. The following describes examples of control of the communication device 1 performed by the controller 10 with reference to FIGS. 2 and 3. FIGS. 2 and 3 are diagrams illustrating the examples of the control by the communication device 1 according to the embodiment.

As illustrated in FIG. 2, the communication device 1 displays an edit screen 51 of e-mail on the display 2A (Step S11). After receiving a selection of a subject on the edit screen 51, the communication device 1 displays a subject input screen 52 on the display 2A (Step S12). At Step S12, the communication device 1 receives character input to the subject input screen 52.

Subsequently, if the predetermined condition is satisfied, the communication device 1 moves the character group entered in the entry field of the subject input screen 52 to the entry field of a message body input screen 53 (Step S13). For example, when a character group including the predetermined number or more of characters has been entered in the destination address entry field or the subject entry field, the communication device 1 moves the character group to the message body entry field. Otherwise, when a punctuation mark is entered in the destination address entry field or the subject entry field, the communication device 1 moves the character group to the message body entry field. When a line break is entered in the destination address entry field or the subject entry field, the communication device 1 moves the character group to the message body entry field. When a send operation is performed while the message body entry field is blank, the communication device 1 moves the character group to the message body entry field. In this manner, if the predetermined condition is satisfied, the communication device 1 determines that the character group presumed to be the message body of the mail has been entered in the entry field for the destination address or the subject of the mail, and moves the entered character group to the message body entry field. This can take appropriate measures for the event in which a user who is inexperienced in composing mail messages erroneously enters the message body of the mail in the entry field for the destination address or the subject of the mail.

FIG. 3 illustrates a case in the example of the control illustrated in FIG. 2 in which, before the character group entered in the destination address entry field or the subject entry field is moved to the message body entry field, the notification is made to ask the user whether the character group may be moved. As illustrated in FIG. 3, the communication device 1 displays the edit screen 51 of the e-mail on the display 2A (Step S21). After receiving a selection of a subject on the edit screen 51, the communication device 1 displays the subject input screen 52 on the display 2A (Step S22). At Step S22, the communication device 1 receives character input to the subject input screen 52.

Subsequently, if the predetermined condition is satisfied, the communication device 1 displays, on the display 2A, a query message M1 for asking whether the entered character group is to be moved to the message body entry field (Step S23), before moving the character group entered in the entry field of the subject input screen 52 to the entry field of the message body input screen 53. If the movement is permitted, the communication device 1 moves the character group to the message body entry field (Step S24). If the movement is not permitted, the communication device 1 returns to the subject input screen 52.

The examples given in FIGS. 2 and 3 illustrates the control in which the communication device 1 moves the character group entered in the entry field of the subject input screen 52 to the entry field of the message body input screen 53. The communication device 1 can perform the same control when characters have been entered in the destination address entry field.

The speaker 11 includes a sound output unit. The speaker 11 outputs a sound signal transmitted from the controller 10 as sound. The speaker 11 may output, for example, a ring tone and music. Either one of the receiver 7 or the speaker 11 may also perform the function of the other.

Each of the cameras 12 and 13 can convert a photographed image into an electrical signal. The camera 12 may be an inward-facing camera that captures an object facing the display 2A. The camera 13 may be an outward-facing camera that captures an object facing the opposite surface of the display 2A. The cameras 12 and 13 may be mounted on the communication device 1 in a functionally and physically integrated state as a camera unit that can be used by being switched between the inward-facing camera and the outward-facing camera.

The connector 14 is a terminal to which another apparatus is connected. The connector 14 may be a universal terminal such as a universal serial bus (USB), a high-definition multimedia interface (HDMI (registered trademark)), Light Peak (Thunderbolt (registered trademark)), or an earphone/microphone connector. The connector 14 may be a specialized connector such as a Dock connector. Examples of an apparatus to be connected to the connector 14 include but are not limited to an external storage, a speaker, and a communication apparatus.

The acceleration sensor 15 detects the direction and magnitude of an acceleration acting on the communication device 1. The orientation sensor 16 detects, for example, the direction of the earth's magnetism, and detects the direction (orientation) of the communication device 1 based on the direction of the earth's magnetism.

The communication device 1 may include a global positioning system (GPS) receiver and a vibrator, in addition to the functional units described above. The GPS receiver can receive radio signals in a certain frequency band from a GPS satellite. The GPS receiver demodulates the received radio signals, and transmits the demodulated signals to the controller 10. The GPS receiver supports the arithmetic processing to find the current location of the communication device 1. The vibrator vibrates a part or the whole of the communication device 1. The vibrator includes, for example, a piezoelectric element or an eccentric motor to generate vibration. Functional units, such as a battery, inevitably used for maintaining the functions of the communication device 1 and controllers inevitably used for controlling the communication device 1 are mounted in the communication device 1

Figure 4:
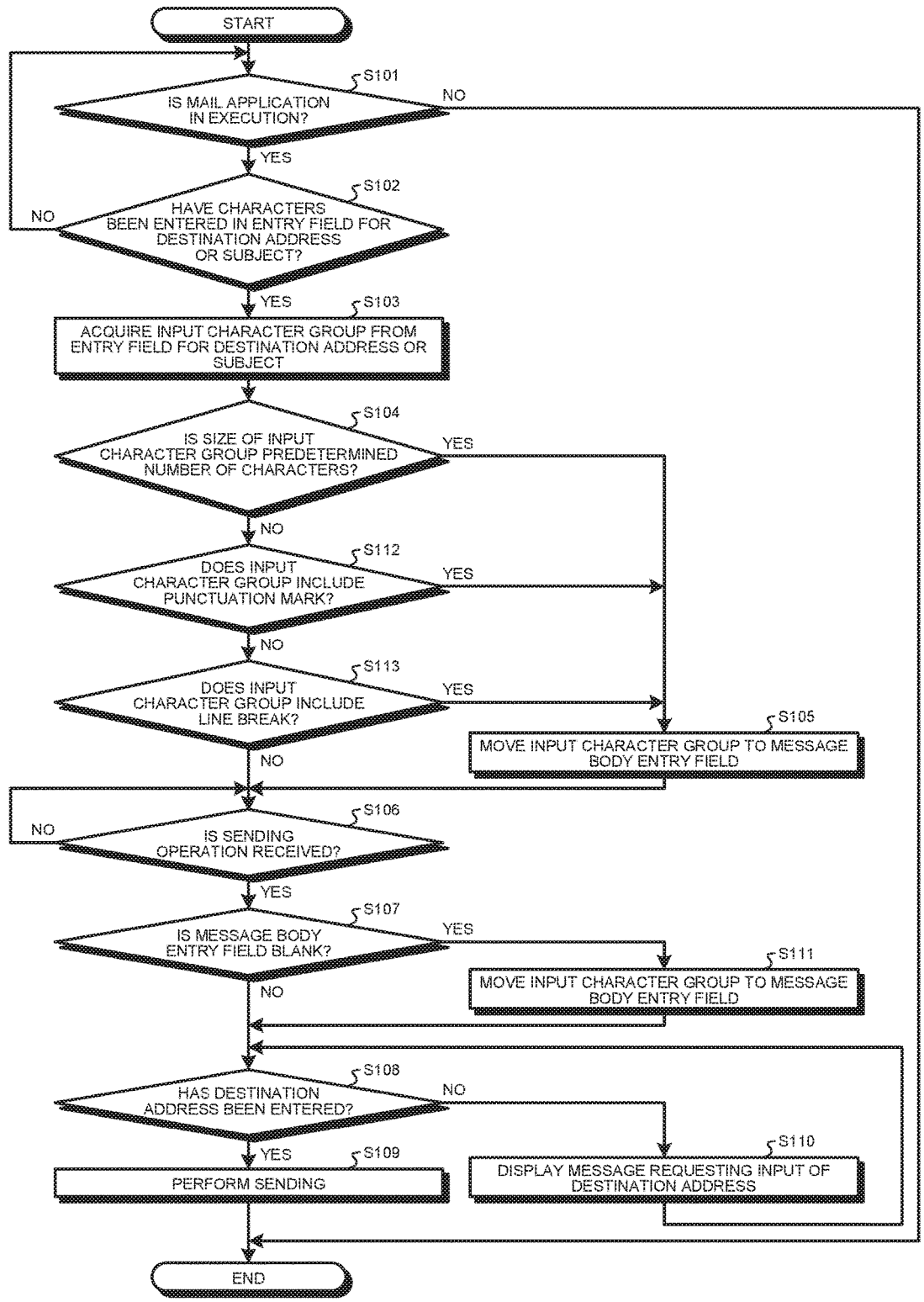
FIG. 4 is a flowchart illustrating a process flow of the communication device according to the embodiment.

The following describes flows of processes performed by the communication device 1 according to the embodiment with reference to FIGS. 4 and 5. FIGS. 4 and 5 are flowcharts illustrating the process flows of the communication device according to the embodiment. The controller 10 executes the control program 9A stored in the storage 9 to perform the processes illustrated in FIGS. 4 and 5.

As illustrated in FIG. 4, the controller 10 determines whether the mail application 9B is in execution (Step S101).

If the determination result is that the mail application 9B is in execution (Yes at Step S101), the controller 10 determines whether any characters have been entered in the entry field for the destination address or the subject (Step S102).

If the determination result is that no characters have been entered in the entry field for the destination address or the subject (No at Step S102), the controller 10 returns to the determination process at Step S101.

If the determination result is that characters have been entered in the entry field for the destination address or the subject (Yes at Step S102), the controller 10 acquires the input character group entered in the entry field for the destination address or the subject (Step S103).

The controller 10 subsequently determines whether the input character group acquired at Step S103 includes the predetermined number or more of characters (Step S104).

If the determination result is that the input character group includes the predetermined number or more of characters (Yes at Step S104), the controller 10 moves the input character group to the message body entry field (Step S105).

The controller 10 subsequently determines whether an e-mail sending operation is accepted (Step S106).

If the determination result is that no e-mail sending operation is accepted (No at Step S106), the controller 10 repeats the determination process at Step S106.

If the determination result is that an e-mail sending operation is accepted (Yes at Step S106), the controller 10 determines whether the message body entry field is blank (Step S107).

If the determination result is that the message body entry field is not blank (No at Step S107), the controller 10 determines whether a destination address has already been entered (Step S108).

If the determination result is that a destination address has already been entered (Yes at Step S108), the controller 10 performs sending (Step S109), and ends the process illustrated in FIG. 4.

If the determination result at Step S108 is that destination address has not been entered (No at Step S108), the controller 10 displays a message requesting to enter a destination address (Step S110), and returns to the determination process at Step S108.

If the determination result at Step S107 is that the message body entry field is blank (Yes at Step S107), the controller 10 moves the input character group to the message body entry field (Step S111), and proceeds to the determination process at Step S108.

If the determination result at Step S104 is that the input character group does not include the predetermined number or more of characters (No at Step S104), the controller 10 determines whether the input character group includes any punctuation mark (Step S112).

If the determination result is that the input character group includes a punctuation mark (Yes at Step S112), the controller 10 proceeds to the processing procedure at Step S105 to move the input character group to the message body entry field.

If the determination result is that the input character group includes no punctuation mark (No at Step S112), the controller 10 determines whether the input character group includes a line break (Step S113).

If the determination result is that the input character group includes a line break (Yes at Step S113), the controller 10 proceeds to the processing procedure at Step S105 to move the input character group to the message body entry field.

If the determination result is that the input character group includes no line break (No at Step S113), the controller 10 proceeds to the processing procedure at Step S106.

If the determination result at Step S101 is that the mail application 9B is not in execution (No at Step S101), the controller 10 ends the process illustrated in FIG. 4.

The process illustrated in FIG. 5 differs from the process illustrated in FIG. 4 in including processing procedures of Steps S205, S206, S213, and S214. As illustrated in FIG. 5, the controller 10 determines whether the mail application 9B is in execution (Step S201).

If the determination result is that the mail application 9B is in execution (Yes at Step S201), the controller 10 determines whether any characters have been entered in the entry field for the destination address or the subject (Step S202).

If the determination result is that no characters have been entered in the entry field for the destination address or the subject (No at Step S202), the controller 10 returns to the determination process at Step S201.

If the determination result is that characters have been entered in the entry field for the destination address or the subject (Yes at Step S202), the controller 10 acquires the input character group entered in the entry field for the destination address or the subject (Step S203).

The controller 10 subsequently determines whether the input character group acquired at Step S203 includes the predetermined number or more of characters (Step S204).

If the determination result is that the input character group includes the predetermined number or more of characters (Yes at Step S204), the controller 10 displays, on the display, the query message for asking whether the input character group is to be moved to the message body entry field (Step S205).

The controller 10 subsequently determines whether the user has permitted the movement of the input character group (Step S206).

If the determination result is that the movement is permitted (Yes at Step S206), the controller 10 moves the input character group to the message body entry field (Step S207).

The controller 10 subsequently determines whether an e-mail sending operation is accepted (Step S208).

If the determination result is that no e-mail sending operation is accepted (No at Step S208), the controller 10 repeats the determination process at Step S208.

If the determination result is that an e-mail sending operation is accepted (Yes at Step S208), the controller 10 determines whether the message body entry field is blank (Step S209).

If the determination result is that the message body entry field is not blank (No at Step S209), the controller 10 determines whether a destination address has already been entered (Step S210).

If the determination result is that a destination address has already been entered (Yes at Step S210), the controller 10 performs sending (Step S211), and ends the process illustrated in FIG. 5.

If the determination result at Step S210 is that no destination address has been entered (No at Step S210), the controller 10 displays the message requesting to enter a destination address (Step S212), and returns to the determination process at Step S210.

If the determination result at Step S209 is that the message body entry field is blank (Yes at Step S209), the controller 10 displays, on the display, the query message for asking whether the input character group is to be moved to the message body entry field (Step S213).

The controller 10 subsequently determines whether the user has permitted the movement of the input character group (Step S214).

If the determination result is that the movement is permitted (Yes at Step S214), the controller 10 moves the input character group to the message body entry field (Step S215), and returns to the determination process at Step S210.

If the determination result at Step S214 is that the movement is not permitted (No at Step S214), the controller 10 proceeds to the determination process at Step S209.

If the determination result at Step S206 is that the movement is not permitted (No at Step S206), the controller 10 proceeds to the determination process at Step S208.

If the determination result at Step S204 is that the input character group does not include the predetermined number or more of characters (No at Step S204), the controller 10 determines whether the input character group includes any punctuation mark (Step S214).

If the determination result is that the input character group includes a punctuation mark (Yes at Step S214), the controller 10 proceeds to the processing procedure at Step S205 to move the input character group to the message body entry field.

If the determination result is that the input character group includes no punctuation mark (No at Step S214), the controller 10 determines whether the input character group includes a line break (Step S215).

If the determination result is that the input character group includes a line break (Yes at Step S215), the controller 10 proceeds to the processing procedure at Step S205 to move the input character group to the message body entry field.

If the determination result is that the input character group includes no line break (No at Step S215), the controller 10 proceeds to the processing procedure at Step S208.

If the determination result at Step S201 is that the mail application 9B is not in execution (No at Step S201), the controller 10 ends the process illustrated in FIG. 5.

In the embodiment described above, if the predetermined condition is satisfied, the communication device 1 determines that the character group presumed to be the message body of the mail has been entered in the entry field for the destination address or the subject of the mail, and moves the entered character group to the message body entry field. This can take appropriate measures for the event in which the user who is inexperienced in composing mail messages erroneously enters the message body of the mail in the entry field for the destination address or the subject of the mail, and thus can improve the ease of operation of character input into e-mail messages.

The processing described in the above embodiment can be applied to electronic devices, such as mobile phones, smartphones, and tablet computers that have a communication function allowing sending of e-mail.

The characteristic embodiment has been described above to completely and clearly disclose the technique according to the appended claims. However, the appended claims should not be limited to the embodiment described above, but should be configured to embody all modifications and alternative configurations conceivable by those skilled in the art within the scope of the basic matter described herein.

Although the embodiments have been described for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication device, configured to send mail including a destination address entry field, a subject entry field, and a message body entry field, the communication device comprising:
  a controller configured to, in response to a determination that a character group, which has been entered in the subject entry field, satisfies a predetermined condition,
    determine that the character group entered in the subject entry field is presumed to be a message body of a mail, and
    move the character group entered in the subject entry field to the message body entry field, wherein
  the character group includes at least one character entered by a user, and
  the character group is determined to satisfy the predetermined condition in response to at least one of
    the at least one character includes a predetermined number or more of characters,
    the at least one character includes a punctuation mark, and
    the at least one character corresponds to a line break.

2. The communication device according to claim 1, wherein
  the controller is further configured to move the character group to the message body entry field in response to a send operation performed while the message body entry field is blank.

3. The communication device according to claim 1, wherein
  before moving the character group to the message body entry field, the controller is further configured to give the user a notification to ask the user to confirm whether to move the character group to the message body entry field.

4. A control method executed by a communication device configured to send mail including a destination address entry field, a subject entry field, and a message body entry field, the control method comprising:
  in response to a determination that a character group, which has been entered in the subject entry field, satisfies a predetermined condition,
    determining that the character group entered in the subject entry field is presumed to be a message body of a mail, and moving the character group entered in the subject entry field to the message body entry field, wherein the character group includes at least one character entered by a user, and the character group is determined to satisfy the predetermined condition in response to at least one of the at least one character includes a predetermined number or more of characters, the at least one character includes a punctuation mark, and the at least one character corresponds to a line break.

5. A non-transitory storage medium that stores a control program for causing, when executed by a communication device configured to send mail including a destination address entry field, a subject entry field, and a message body entry field, the communication device to execute:

in response to a determination that a character group, which has been entered in the subject entry field, satisfies a predetermined condition, determining that the character group entered in the subject entry field is presumed to be a message body of a mail, and moving the character group entered in the subject entry field to the message body entry field, wherein the character group includes at least one character entered by a user, and the character group is determined to satisfy the predetermined condition in response to at least one of the at least one character includes a predetermined number or more of characters, the at least one character includes a punctuation mark, and the at least one character corresponds to a line break.

6. The communication device according to claim 1, wherein the controller is further configured to, in response to a determination that a further character group, which has been entered in the destination address entry field satisfies the predetermined condition, determine that the further character group entered in the destination address entry field is presumed to be the message body of the mail, and move the further character group from the destination address entry field to the message body entry field.

* * * * *